United States Patent
Wesseloh et al.

(10) Patent No.: US 11,667,368 B2
(45) Date of Patent: Jun. 6, 2023

(54) PRESSURE BULKHEAD FOR A PRESSURIZED FUSELAGE OF A VEHICLE

(71) Applicant: Airbus Operations GmbH, Hamburg (DE)

(72) Inventors: Marc Wesseloh, Hamburg (DE); Annalena Merten, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1059 days.

(21) Appl. No.: 16/410,810

(22) Filed: May 13, 2019

(65) Prior Publication Data

US 2020/0001963 A1  Jan. 2, 2020

(30) Foreign Application Priority Data

Jun. 27, 2018 (DE) .......................... 102018115541.7

(51) Int. Cl.
B64C 1/10 (2006.01)

(52) U.S. Cl.
CPC ...................................... B64C 1/10 (2013.01)

(58) Field of Classification Search
CPC ....................................................... B64C 1/10
See application file for complete search history.

(56) References Cited

U.S. PATENT DOCUMENTS

| | | | | |
|---|---|---|---|---|
| 2,623,721 | A * | 12/1952 | Harrington | B64D 37/06 244/135 R |
| 7,252,269 | B1 * | 8/2007 | Ford | F17C 1/00 244/158.1 |
| 10,501,163 | B2 * | 12/2019 | Jörn | B64C 1/10 |
| 10,793,285 | B2 * | 10/2020 | Kooiman | B64D 37/04 |
| 11,286,030 | B2 * | 3/2022 | Hara | B64C 1/10 |
| 2015/0008285 | A1 * | 1/2015 | Zuardy | B64C 1/10 244/119 |
| 2017/0158304 | A1 * | 6/2017 | Vázquez Castro | B64C 1/10 |
| 2022/0411092 | A1 * | 12/2022 | Linde | B64D 37/04 |

FOREIGN PATENT DOCUMENTS

| | | | |
|---|---|---|---|
| DE | 102012005451 A1 | 9/2013 | |
| DE | 102015205934 B3 | 9/2016 | |
| DE | 102017221444 A1 * | 5/2019 | ............... B64C 1/10 |
| KR | 200151798 Y1 * | 7/1999 | |
| KR | 2002073830 A * | 9/2002 | ............... B64C 1/10 |
| KR | 100443860 B1 * | 8/2004 | |

* cited by examiner

*Primary Examiner* — Magdalena Topolski

(74) *Attorney, Agent, or Firm* — Greer, Burns & Crain, Ltd.

(57) ABSTRACT

A pressure bulkhead for a pressurized fuselage of a vehicle has an axial inner surface and an axial outer surface. The pressure bulkhead includes a tank that is seated on at least one of the inner surface and the outer surface, and extends in the axial direction. The tank includes at least one connection for introducing and/or discharging a fluid.

16 Claims, 4 Drawing Sheets

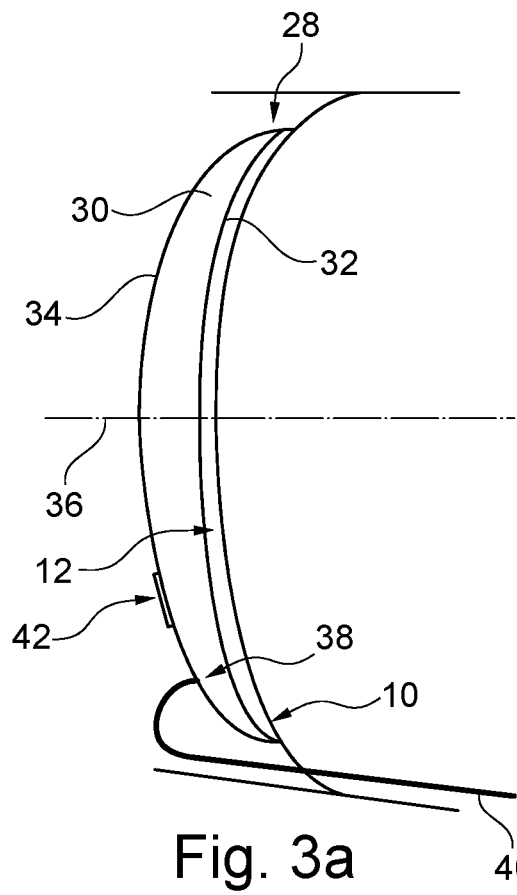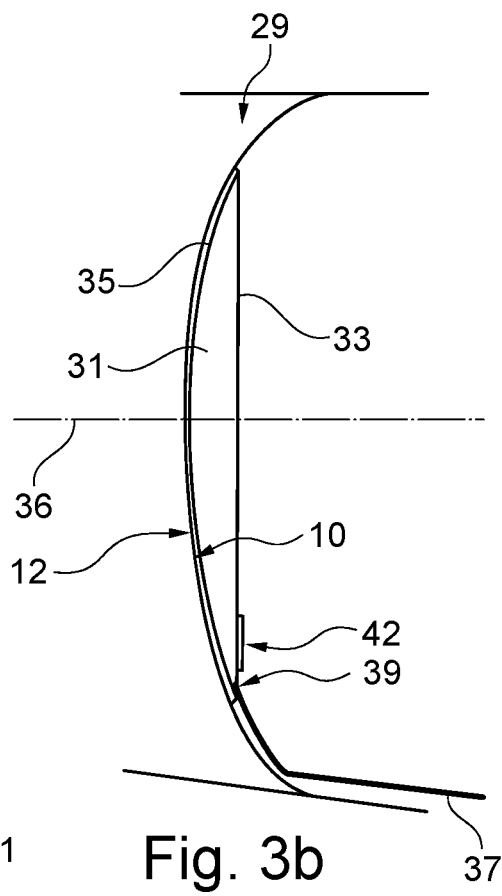
Fig. 3a　　Fig. 3b
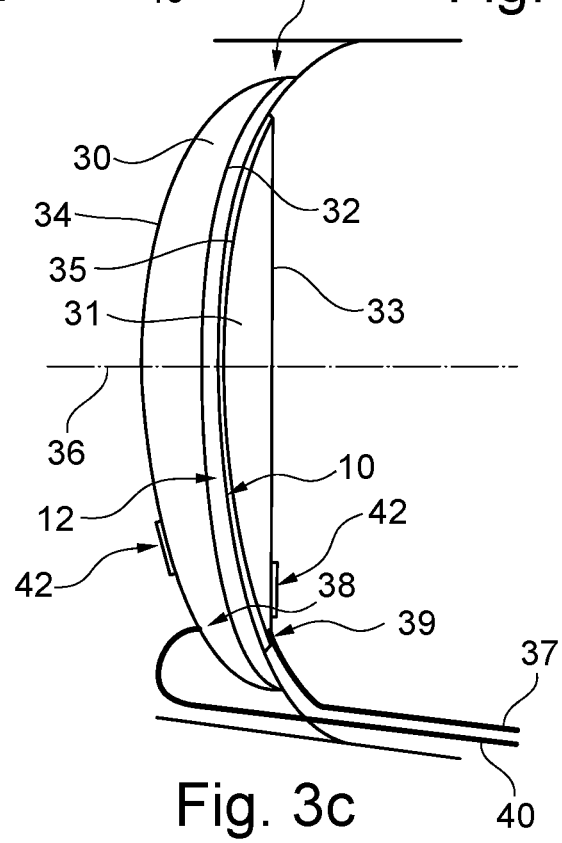
Fig. 3c

PRESSURE BULKHEAD FOR A PRESSURIZED FUSELAGE OF A VEHICLE

CROSS-REFERENCE TO PRIORITY APPLICATION

This application claims the benefit of, and priority to, German patent application number DE 102018115541.7, filed Jun. 27, 2018. The content of the referenced application is incorporated by reference herein.

TECHNICAL FIELD

Embodiments of the subject matter described herein relate generally to a pressure bulkhead for a pressurized fuselage of a vehicle, and to a vehicle having a pressurized fuselage and to such a pressure bulkhead.

BACKGROUND

In aircraft having a pressurized aircraft fuselage, a pressure bulkhead is conventionally located at a rear end of the aircraft fuselage and delimits the pressurized area there. They extend substantially over the entire cross-section of the aircraft fuselage there. Known pressure bulkheads often have a convex curvature directed into an unpressurized area. In commercial aircraft, the pressure bulkheads are subjected to a pressure difference of up to 0.5 bar, for instance, and therefore possess a very high mechanical strength. Nevertheless, pressure bulkheads are conventionally constructed such that they have as low a weight as possible.

Patent publication DE 10 2015 205 934 B3, for instance, discloses a pressure bulkhead having a plurality of material layers, which each include a fiber-reinforced plastics material.

Patent publication DE 10 2012 005 451 A1 discloses a pressure fuselage of an aircraft, having a fuselage shell and a pressure bulkhead arranged therein for forming a pressure area inside the fuselage, which pressure bulkhead is positioned at the edge in the interior of the fuselage shell, wherein the pressure bulkhead has a lenticular cross-section and possesses a sandwich construction which includes a foam core enclosed between two mutually opposing outer shells.

BRIEF SUMMARY

An object of the disclosure is to propose a pressure bulkhead for a pressurized fuselage of a vehicle, which realizes an alternative solution to known pressure bulkheads and, with this, leads to better use of the installation space and/or to a more advantageous weight.

The object is achieved by a pressure bulkhead having the features of the independent Claim 1. Advantageous embodiments and further developments are revealed in the sub-claims and the description below.

A pressure bulkhead for a pressurized fuselage of a vehicle having an axial inner surface and an axial outer surface is proposed, which is characterized by at least one tank, which is seated on the inner surface or the outer surface and extends in the axial direction and comprises at least one connection for introducing and/or discharging a fluid.

The pressure bulkhead according to the disclosure can consequently have a shape which is based on the shape of a conventional pressure bulkhead. An axial inner surface defines a surface of the pressure bulkhead which is in contact with the pressurized space. This could span the entire fuselage cross-section in the appropriate position in the aircraft fuselage. The axial outer surface is arranged on the opposite side of the pressure bulkhead and projects into the unpressurized side of the vehicle fuselage. The contour of the pressure bulkhead depends on the contour of the vehicle fuselage and can have an oval, circular, rounded or other suitable design.

A feature of the pressure bulkhead according to the disclosure relates to the tank, which is seated on at least one of the inner surface and the outer surface and extends in the axial direction from there. Consequently, a tank is arranged on the inner surface or on the outer surface or a respective tank is provided on both surfaces.

The tank should be interpreted as a container which, in the sense of the disclosure, can receive, in particular, a liquid and release it again. The tank is arranged on the mechanical structure of the pressure bulkhead and therefore utilizes installation space which is not conventionally used for storing liquids.

The axial extent should furthermore be understood to mean that the tank has a certain overall depth or thickness which produces the extent of the tank along a center axis of the pressure bulkhead. The thickness and therefore the extent in the axial direction depends on the requirement relating to the tank volume and the available installation space on the pressure bulkhead.

The at least one connection can be an individual connection, which can be used both for filling and emptying the tank or for extracting the stored liquid. Such a connection can be arranged, for instance, on an underside of the pressure bulkhead according to the disclosure. Alternatively to this, two separate connections can also be provided, which can be used to introduce and/or discharge fluid. Both connections could be arranged at mutually opposing ends of the tank in the vertical direction, for instance to compensate the extracted fluid volume by supplying air at an upper side. When arranged in an aircraft, such a connection at an upper side can also be used to enable pressure fluctuations due to varying flying heights through the admission and discharge of air.

In an advantageous embodiment, the tank is rigidly formed. The tank accordingly has a geometrical shape which does not depend on the fill level. To this end, the tank can include a material which provides sufficient rigidity for this purpose. In addition to metal constructions, it is also possible to use plastics materials which could be fiber-reinforced to increase the rigidity.

In an advantageous embodiment, the tank comprises an outer shell seated on the outer surface, wherein the outer shell possesses a curvature which at least corresponds to, or is more pronounced than, a curvature of the outer surface. The outer shell of the tank is the shell which, with the outer surface of the pressure bulkhead, encloses an area which can be used as the tank volume. The shape of the outer shell also depends on the curvature of the outer surface. If the outer surface is convexly curved and consequently extends into the unpressurized area in the axial direction, the outer shell must at least partially follow this shape. It can therefore be provided for the outer shell to have a curvature which at least corresponds to the curvature of the outer surface. The curvature refers to the reciprocal of the radius of curvature of the outer surface. The radius of curvature of the outer shell is consequently, at the most, as great as the radius of curvature of the outer surface. The spacing of the outer shell from the outer surface increases from a radially outer edge area to a center of the outer shell and the outer surface. If the pressure bulkhead is constructed to be planar, the outer shell could likewise be planar, although, to achieve a usable tank volume, it must be at an axial spacing from the outer surface. This could be realized by fastening means which are suitable for this purpose, for instance flanges and, optionally, spacers. In this construction, however, it would make sense for the outer shell to be given a curvature such that it extends convexly from the planar pressure bulkhead into the unpressurized area. The same applies in the case of convexly curved outer surfaces. If the outer shell follows the curvature of the outer surface exactly, the outer shell must be arranged at a certain spacing from the outer surface to enable the provision of a tank volume. However, it would then make sense to curve the outer shell in a more pronounced manner. It is thus possible to ensure the inwardly increasing spacing of the outer shell from the outer surface.

In an advantageous embodiment, the tank can comprise an inner shell, which possesses a curvature which follows a curvature of the outer surface and wherein the inner shell and the outer shell are connected to one another in a fluid-tight manner. The tank is consequently composed of the inner shell and the outer shell, which enclose a usable tank volume between them. This consequently depends on the size of the surfaces and on the curvatures or the spacings between the two shells. To utilize the installation space as effectively as possible, it makes sense to connect the inner shell as flush as possible to the outer shell. The inner shell could, in particular, follow the curvature of the outer surface. To enable a certain deformability of the pressure bulkhead, which is determined by the design of the pressure bulkhead, it can make sense to provide a certain spacing between the inner shell and the outer surface and/or to curve the inner shell in a somewhat more pronounced manner than the outer surface. Deformation-related damage to the tank can therefore be prevented.

A local spacing between the outer shell and the outer surface can preferably increase from a radially outer area to a center of the pressure bulkhead so that a usable tank volume is defined by the outer shell and the outer surface or the inner shell arranged thereon.

In a further embodiment, the tank can comprise an outer shell seated on the inner surface, wherein the outer shell possesses a curvature which, at the most, corresponds to, or is less pronounced than, a curvature of the inner surface.

Consequently, a tank could be arranged on the pressurized side of the pressure bulkhead. The design is realized analogously to the tank on the outer side of the pressure bulkhead, i.e. on the unpressurized side. The less pronounced curvature can also include a curvature which is greater in terms of its value but which extends into an opposite side. If the pressure bulkhead is based on a planar design, it can consequently be expedient to curve the outer shell of the tank such that it extends convexly from the inner surface into the pressurized area of the fuselage.

In this arrangement, the tank can also comprise an inner shell which possesses a curvature which follows a curvature of the inner surface, wherein the inner shell and the outer shell are connected to one another in a fluid-tight manner.

A local spacing between the outer shell and the inner surface can likewise preferably increase from a radially outer area to a center of the pressure bulkhead. A usable tank volume is consequently defined between the inner surface, or the inner shell arranged thereon, and the outer shell.

In the variants having the inner shell and outer shell, the inner shell can comprise a smaller surface than the outer shell and the outer shell can possess an edge strip which projects over the inner shell and is connected to a flange or lug of the appropriate outer surface or inner surface. Both shells are connected to one another to also ensure the function of the tank regardless of the fastening. The sealing and mechanical connection between the two shells can consequently be produced according to different criteria and using different method procedures from those for connecting the pressure bulkhead to the vehicle structure.

In a preferred embodiment, the appropriate inner surface or outer surface can comprise a circumferential flange or adjoin this, wherein at least one component of the tank is fastened to the circumferential flange. The pressure bulkhead can therefore comprise a flange or adjoin such a flange in order to connect the pressure bulkhead itself to a structure of the aircraft. This flange can also be used for connecting the tank. The inner surface or the outer surface can itself comprise a flange, which is used exclusively for the task of supporting the tank. This can depend on whether the pressure bulkhead according to the disclosure is to be retrofitted with a tank or whether a pressure bulkhead according to the disclosure is provided with a tank arranged thereon directly during the manufacture of the aircraft. The flange does not necessarily have to extend continuously around the circumference, but can also be realized in the form of individual lugs which are arranged on a circumferential path.

The tank can overlap the circumferential flange, at least in some areas. The above-mentioned edge strip could be brought to overlap this flange, for instance, in order to realize a riveted, welded or bonded connection here.

The outer surface of the pressure bulkhead can be convexly curved. Such outer surfaces which extend convexly into the unpressurized area can be found in particular in commercial aircraft.

It can be advantageous that a first tank is arranged on the outer surface and a second tank is arranged on the inner surface. The installation space occupied by a pressure bulkhead can thus be used effectively for other functions.

The disclosure further relates to a vehicle comprising a pressurized fuselage and a pressure bulkhead having the features described above.

The tank could be a waste water tank, a water tank, a fuel tank, a lubricant tank or a hydraulic reservoir. A waste water tank can be designed to store grey water or black water. A water tank could store service water or drinking water, for instance. A fuel tank does not necessarily have to be used to store conventional fuel for thrust-generating engines, but could also be used to store liquid fuel for fuel cells which are arranged in the unpressurized area or in the pressurized area of the aircraft fuselage. Furthermore, a hydraulic reservoir can also be realized by the tank, which hydraulic reservoir is coupled to a hydraulic system and can receive and release hydraulic liquid without pressurization.

The tank could furthermore comprise an inlet for introducing an inert gas in order to fill a volume of the tank which is not occupied by liquid with a protective gas. This protective gas can be nitrogen-enriched or oxygen-depleted air, which is provided by an OBIGGS, OBOGS and/or a fuel cell.

The exemplary embodiments relate to a main pressure bulkhead which is arranged at a rear end of an aircraft fuselage. However, other designs of pressure bulkhead are also possible, which are arranged, for instance, in a wing/fuselage transition or on a nose of the aircraft fuselage.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible applications of the present disclosure are revealed in the description below of the exemplary embodiments and the figures. In this case, all described and/or depicted features form the subject matter of the disclosure in themselves and in any combination, also regardless of their composition in the individual claims or their appendances. In the figures, the same reference signs furthermore represent the same or similar objects.

FIGS. 3a, 3b and 3c show further exemplary embodiments, each in a side view.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
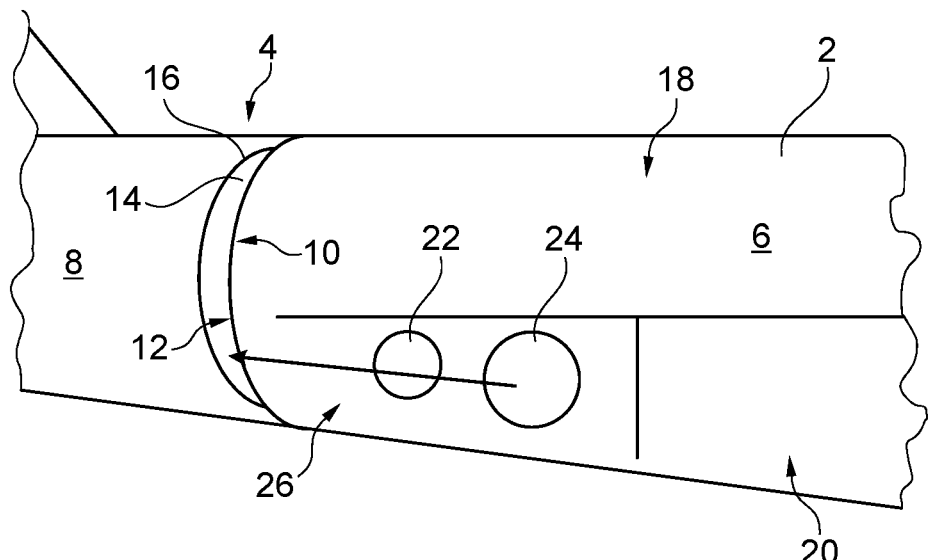
FIGS. 1 and 2 show a first exemplary embodiment of a pressure bulkhead according to the invention in a side view.

FIG. 1 shows an aircraft fuselage 2 having a pressure bulkhead 4, which separates a pressurized area 6 from an unpressurized area 8. The pressure bulkhead 4 comprises an inner surface 10 and an outer surface 12. The inner surface 10 is in contact with the pressurized area 6, whilst the outer surface 12 is directed towards the unpressurized area 8.

By way of example, a tank 14 is located on the outer surface 12, which tank merely comprises an outer shell 16 here, which is seated on the outer surface 12. The curvature of the outer shell 16 is somewhat more pronounced than the curvature of the outer surface 12. Consequently, the radius of curvature of the outer shell 16 is smaller than that of the outer surface 12. The extent of the outer shell 16 in the radial direction is moreover somewhat smaller than that of the outer surface 12. The tank 14 therefore forms a lenticular supplementary body on the outer surface 12. The tank 14 is then available for receiving, in particular, liquids.

By way of example, a cabin 18, a hold 20 and waster water tanks 22 and 24 in a waste water compartment 26 provided for said waste water tanks are illustrated in the pressurized area 6 in FIG. 1. The waste water compartment is dimensioned such that a certain quantity of waste water can be stored therein. As a result, the available volume of the hold 20, for example, is reduced.

Figure 2:
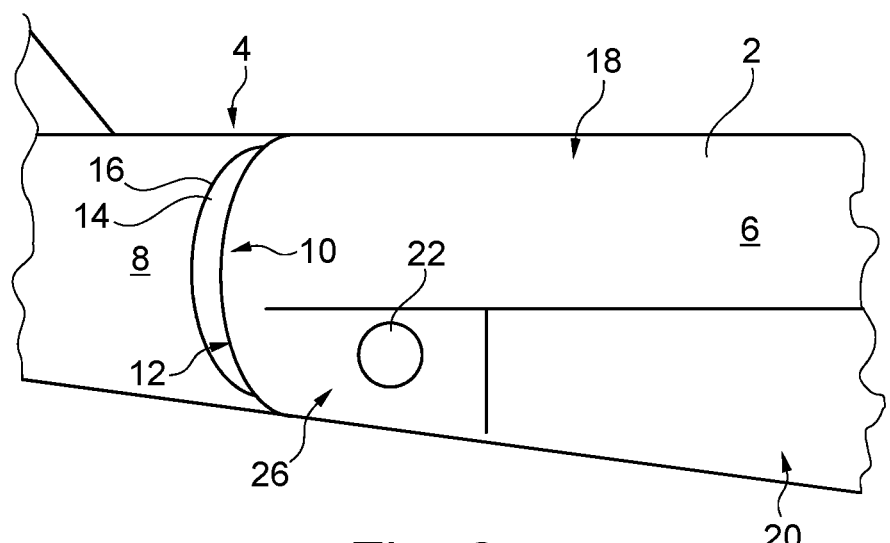

As shown in FIG. 2, it is possible to save on the waste water tank 24, for example, through the use of the tank 14, which means that the hold 20 can be increased in the axial direction due to the waste water compartment 26 having smaller dimensions. The pressure bulkhead 4 is used to considerably increase the hold 20 by making use of a relatively slim installation space directly on the outer surface 12.

FIG. 3a shows a variant in the form of a pressure bulkhead 28, in which a tank 30 is provided which comprises an inner shell 32 and an outer shell 34. The inner shell 32 directly adjoins the outer surface 12 and follows the curvature of the outer surface 12. The outer shell 34 is meanwhile curved in a somewhat more pronounced manner so that, at least in the cross-sectional view, the spacing between the inner shell 32 and the outer shell 34 decreases outwardly in the radial direction, as seen from a center axis 36.

By way of example, a connection 38 for discharging a fluid is indicated. Connected to this is a line 40 which, by way of example, extends through the inner surface 10 and the outer surface 12. A liquid received in the tank 30 can thus be removed and supplied to consumers. In this case, the tank 30 could be a service water or fresh water tank, for instance.

However, the connection 38 can also be an inlet which can be used to take in waste water, for example.

It may be necessary to make an interior of the tank 30 accessible for maintenance purposes. By way of example, the outer shell 34 comprises a closeable manhole 42 for this purpose. When the tank 30 is empty, the manhole 42 can be open to enable a person to at least look into the tank 30 or to climb therein. Cleaning of the tank 30 could therefore be carried out, for example.

FIG. 3b shows a pressure bulkhead 29, which comprises a tank 31 on the inner surface 10. This tank possesses an outer shell 33, which extends away from the inner surface 10 and thus provides a usable tank volume. At the same time, an inner shell 35 is arranged directly on the inner surface 10, which inner shell substantially follows the curvature of the inner surface 10. By way of example, the outer shell 33 likewise comprises a manhole 42, through which an interior of the tank 31 can be reached. A line 37 is connected to a connection 39 of the tank 31.

FIG. 3c shows the combination of the pressure bulkhead 28 and 29 in the form of a pressure bulkhead 41, which comprises a tank 30 on the outer surface 12 and a tank 31 on the inner surface 10.

Figure 4:
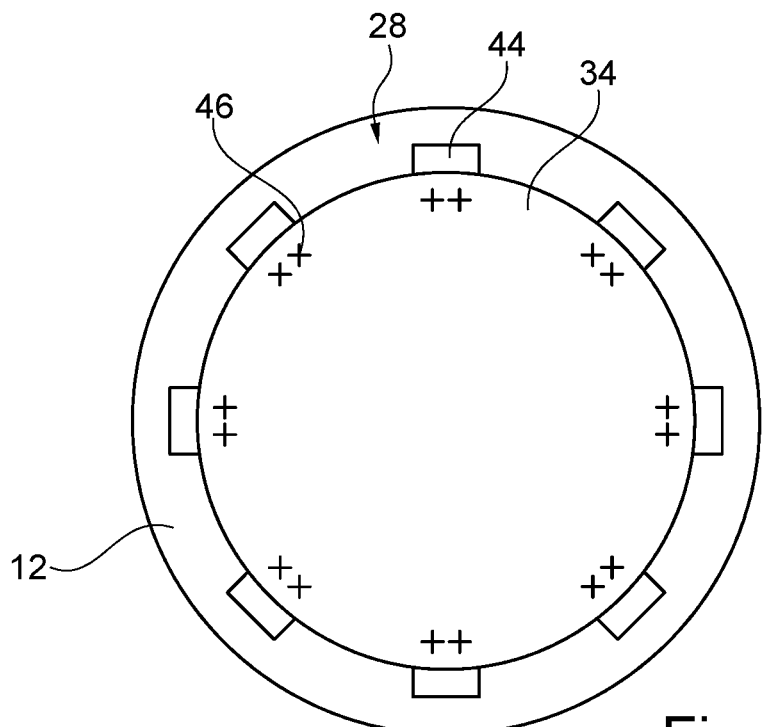
FIG. 4 shows a pressure bulkhead in a front view of the tank.

By way of example, FIG. 4 shows the pressure bulkhead 28 as a plan view in the flying direction. It should be pointed out that, when arranging a tank on a side facing the pressurized area, a plan view contrary to the flying direction would be illustrated in the same manner.

Consequently, in the exemplary embodiment shown here, it is possible to see the outer shell 34, which is fastened to individual lugs 44 which are arranged on the outer surface 12. To this end, connecting elements 46 are provided, which are fitted on the outer shell 34. The lugs 44 are arranged such that they extend around the center axis 36 in the circumferential direction and are spaced apart from one another. By way of example, eight lugs 44 are shown here, although there could also be more or fewer lugs. The lugs 44 could also form a fully circumferential edge strip to which the outer shell 34 could be connected.

Figure 5:
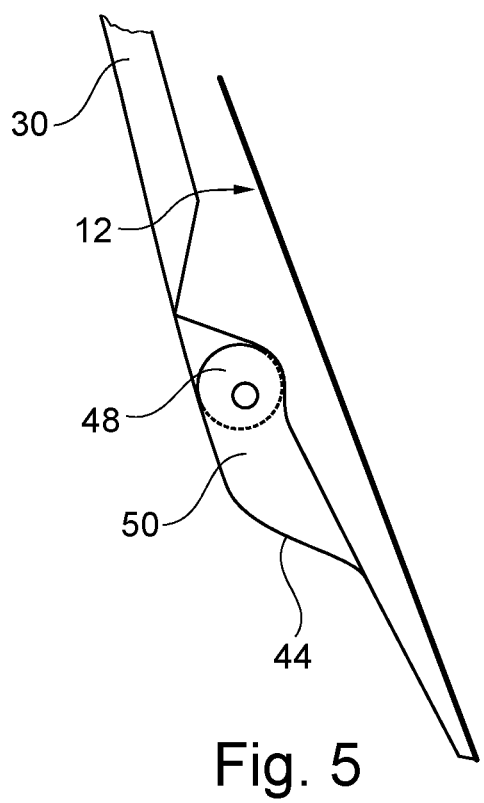
FIGS. 5 and 6 show different variants for connecting the tank to a flange.

FIG. 5 shows a possible connection between a tank 30 and a lug 44 with the aid of a bolt connection. To this end, a clevis 50 can be provided, which is connected to an eye 48 by a bolt.

Figure 6:
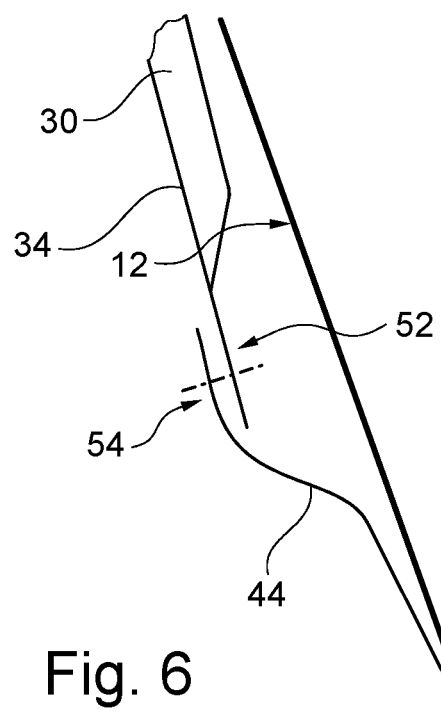

In FIG. 6, a lug 44 is likewise shown, which is in contact with a strip 52 of the outer shell 34 of the tank 30. A rivet or screw connection 54 is thus produced in an overlap between the edge strip 52 and the lug 44.

Figure 7:
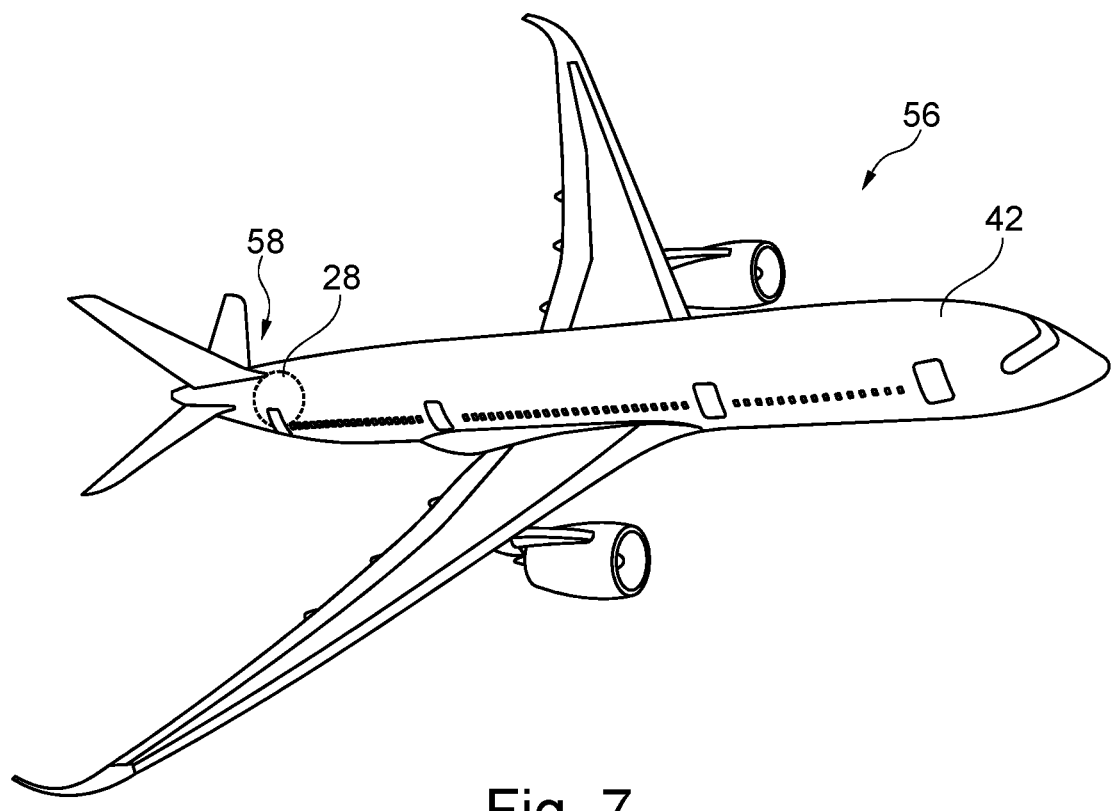
FIG. 7 shows an aircraft with a pressurized fuselage and a pressure bulkhead according to the disclosure.

FIG. 7 shows an aircraft 56, which is equipped with a fuselage 6 and can be equipped with a pressure bulkhead 28 (or pressure bulkhead 4) in a rear area 58.

In addition, it should be pointed out that "comprising" does not exclude other elements or steps and "a" does not exclude a multiplicity. Furthermore, it should be pointed out that features which have been described with reference to one of the above exemplary embodiments can also be used in combination with other features of other exemplary embodiments described above. Reference signs in the claims should not be regarded as limiting.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A pressure bulkhead for a pressurized fuselage of a vehicle, the pressure bulkhead comprising:
   an axial inner surface;
   an axial outer surface; and
   a first tank seated on the inner surface and a second tank seated on the outer surface, and the first and second tanks both extending in an axial direction, the first and second tanks both comprising at least one connection for introducing and/or discharging a fluid,
   wherein the first and second tanks are rigidly formed.

2. The pressure bulkhead according to claim 1, wherein the second tank comprises an outer shell seated on the outer surface, wherein the outer shell has a curvature that at least corresponds to, or is more pronounced than, a curvature of the outer surface.

3. The pressure bulkhead according to claim 2, wherein the second tank comprises an inner shell having a curvature that follows a curvature of the outer surface, and wherein the inner shell and the outer shell are connected to one another in a fluid-tight manner.

4. The pressure bulkhead according to claim 2, wherein a local spacing between the outer shell and the outer surface increases from a radially outer area to a center of the pressure bulkhead.

5. The pressure bulkhead according to claim 1, wherein the first tank comprises an outer shell seated on the inner surface, wherein the outer shell has a curvature which, at most, corresponds to, or is less pronounced than, a curvature of the inner surface.

6. The pressure bulkhead according to claim 5, wherein the first tank comprises an inner shell having a curvature which follows a curvature of the inner surface, and wherein the inner shell and the outer shell are connected to one another in a fluid-tight manner.

7. The pressure bulkhead according to claim 5, wherein a local spacing between the outer shell and the inner surface increases from a radially outer area to a center of the pressure bulkhead.

8. The pressure bulkhead according to claim 2, wherein the inner shell comprises a smaller surface than the outer shell, and the outer shell comprises an edge strip which projects over the inner shell and is connected to a flange or lugs of the appropriate outer surface or inner surface.

9. The pressure bulkhead according to claim 5, wherein the inner shell comprises a smaller surface than the outer shell, and the outer shell comprises an edge strip which projects over the inner shell and is connected to a flange or lugs of the appropriate outer surface or inner surface.

10. The pressure bulkhead according to claim 1, wherein the appropriate inner surface or outer surface comprises a circumferential flange wherein at least one component of the first tank or the second tank is fastened to the circumferential flange.

11. The pressure bulkhead according to claim 10, wherein the first tank or the second tank overlaps the circumferential flange.

12. The pressure bulkhead according to claim 1, wherein the outer surface is convex.

13. A vehicle comprising:
    a pressurized fuselage; and
    a pressure bulkhead according to claim 1.

14. The vehicle according to claim 13, wherein the tank is a waste water tank, a water tank, a fuel tank, a lubricant tank or a hydraulic reservoir.

15. A pressure bulkhead for a pressurized fuselage of a vehicle, the pressure bulkhead comprising:
    an axial inner surface;
    an axial outer surface; and
    a tank seated on the inner surface or the outer surface, and extending in an axial direction, the tank comprising at least one connection for introducing and/or discharging a fluid,
    wherein the tank comprises an outer shell seated on the outer surface, wherein the outer shell has a curvature that at least corresponds to, or is more pronounced than, a curvature of the outer surface, and
    wherein the inner shell comprises a smaller surface than the outer shell, and the outer shell comprises an edge strip which projects over the inner shell and is connected to a flange or lugs of the appropriate outer surface or inner surface.

16. A pressure bulkhead for a pressurized fuselage of a vehicle, the pressure bulkhead comprising:
    an axial inner surface;
    an axial outer surface; and
    a tank seated on the inner surface or the outer surface, and extending in an axial direction, the tank comprising at least one connection for introducing and/or discharging a fluid,
    wherein the tank comprises an outer shell seated on the inner surface, wherein the outer shell has a curvature which, at most, corresponds to, or is less pronounced than, a curvature of the inner surface, and
    wherein the inner shell comprises a smaller surface than the outer shell, and the outer shell comprises an edge strip which projects over the inner shell and is connected to a flange or lugs of the appropriate outer surface or inner surface.

* * * * *